(12) United States Patent
Corzine

(10) Patent No.: US 6,459,596 B1
(45) Date of Patent: Oct. 1, 2002

(54) METHOD AND APPARATUS FOR A REDUCED PARTS-COUNTS MULTILEVEL RECTIFIER

(75) Inventor: Keith Allen Corzine, Milwaukee, WI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/932,568

(22) Filed: Aug. 17, 2001

Related U.S. Application Data

(60) Provisional application No. 60/226,218, filed on Aug. 18, 2000.

(51) Int. Cl.$^7$ .............................................. H02M 5/458
(52) U.S. Cl. ............................ 363/37; 363/89; 363/127
(58) Field of Search .............................. 363/34, 37, 89, 363/127

(56) References Cited

U.S. PATENT DOCUMENTS

| | | |
|---|---|---|
| 4,167,775 A | 9/1979 | Baker et al. |
| 4,270,163 A | 5/1981 | Baker |
| 5,644,483 A | 7/1997 | Peng et al. |
| 5,742,493 A * | 4/1998 | Ito et al. ............... 363/37 |
| 5,805,437 A | 9/1998 | Gruning |
| 6,005,788 A | 12/1999 | Lipo et al. |
| 6,031,738 A | 2/2000 | Lipo et al. |
| 6,058,031 A | 5/2000 | Lyons et al. |
| 6,236,580 B1 | 5/2001 | Aiello et al. |

OTHER PUBLICATIONS

D. Divan, "Low Stress Switching for Efficiency," IEEE Spectrum, vol. 338, No. 12, pp. 33–39, Dec. 1996.

J. He and N. Mohan, "Parallel Resonant DC Link Circuit—A Novel Zero Switching Loss Topology with Minimum Voltage Stresses," IEEE Transations on Power Electronics, vol. 6, No. 4, pp687–694, Oct. 1991.

R.W. DeDoncker and J.P. Lyons, "The Auxilliary Resonant Commutated Pole Converter," Proceeding of the IEEE Industry Applications Society Conference, vol.2, pp. 1228–1335, Oct. 1990.

(List continued on next page.)

Primary Examiner—Jeffrey Sterrett
(74) Attorney, Agent, or Firm—Steven W. Crabb

(57) ABSTRACT

A method and apparatus for a multilevel rectifier with fewer switching components is provided. The method reduces the required number of switching devices in an n level switching device and clamp diode rectifier. The method is valid for any positive integer number of levels equal to or greater than three. The method is also applicable to any phase system. The method reduces the number of switching devices required for an n-level rectifier from the standard 2(n−1) by 2 switching devices for every phase leg. A multilevel unidirectional power converter system including a multilevel rectifier that has a reduced number of switching devices is provided. The system comprises an input to a multilevel rectifier with at least one phase leg. The rectifier is composed of switching device and anti-parallel diode pairs and clamping diodes. The number of switching devices required depends on the given number of voltage levels according to the equation 2(n−1) where n is the number of voltage levels. This number of required devices is then reduced in accordance with the present invention by removing the top and the bottom switching devices from the rectifier circuit. The anti-parallel diodes remain in the rectifier circuit. There is no performance degradation from this reduction in the number of switching devices to the rectifier.

6 Claims, 11 Drawing Sheets

OTHER PUBLICATIONS

B.T. Kuhn and S.D. Sudhoff, "Modeling Considerations in ARCP Versus Hard Switched Drives," Proceedings of the Naval Symposium on Electric Machines, pp. 161–168, Jul. 1997.

A. Nabe, I. Takahashi, and H. Akagi, "A New Neutral–Point Clamped PWM Inverter," IEEE Transactions on Industry Applications, vol. 17, No. 5, pp. 518–523, Sep./Oct. 1981.

K.A. Corzine, S.D. Sudhoff, and C.A. Whitcomb, "Performance Characteristics of a Cascaded Two–Level Converter," IEEE Transactions on Energy Conversion, vol. 14, No. 3, pp. 433–439, Sep. 1999.

K.A. Corzine, "A Hysteresis Current–REgulated Control for Multi–Level Converters", Accepted for publication in IEEE Transactions on Energy Conversion, Dec. 1998.

K.A. Corzine and S.D. Sudhoff, "High State Count Power Converters: An Alternate Direction in Power Electronics Technology," Proceedings of the Society of Automotive Engineers Aerospace Power Systems Conference, Williamsburg VA, pp. 141–151, Apr. 1998.

K.A. Corzine, S.D. Sudhoff, E.A. Lewis, D.H. Schmucker, R.A. Youngs, and H.J. Hegner, "Use of Multi–level Converters in Ship Propulsion Drives," Proceedings of the All Electric Ship Conference, London England, vol. 1, pp. 155–163, Sep. 1998.

M. Fracchia, T. Ghiara, M. Marchesoni, and M. Mazzucchelli, "Optimized Modulation Techniques for the Generalized N–Level Converter", Proceedings of the IEEE Power Electronics Specialist Conference, vol. 2, pp. 1205–1213, Mar. 1992.

G. Sinha and T.A. Lipo, "A Four Level Rectifier–Inverter System for Drive Applications", Proceedings of the IEEE Industry Applications Society Conference, vol. 2, pp. 980–987, Oct. 1996.

Y. Zhao, Y. Li, and T.A. Lipo, "Force Commutated Three Level Boost Type Rectifier," IEEE Transactions on Industry Applications, vol. 31, No. 1, pp. 155–161, Jan.–Feb. 1995.

M.C. Klabunde, Y. Zhao, and T.A. Lipo, "Current Control of a 3–Level Rectifier/Inverter Drive System," Proceeding of the IEEE Industry Applications Society Conference, vol. 2, pp. 859–866, Oct. 1994.

J.A. Houldsworth and D.A. Grant, "The Use of Harmonic Distortion to Increase the Output Voltage of a Three–Phase PWM Inverter", IEEE Transactions on Industry Applications, vol. 20, No. 5, pp. 1224–1228, Sep./Oct. 1984.

C. Krause, O. Wasynczuk, and S.D. Sudhoff, Analysis of Electric Machinery, IEEE Press, Dec. 1995, pp.133–160.

T.M. Rowan and R.J. Kirkman, "A New Synchronous Current Regulator and an Analysis of Current–Regulated PWM Inverters", IEEE Transaction on Industry Applications, vol. 22, No. 4, pp. 678–690, Jul./Aug. 1986.

* cited by examiner

METHOD AND APPARATUS FOR A REDUCED PARTS-COUNTS MULTILEVEL RECTIFIER

CROSS-REFERENCE TO RELATED APPLICATION

This application claims the benefit of U.S. Provisional Application No. 60/226,218 filed Aug. 18, 2000, entitled "Reduced Parts-Counts Multilevel Rectifier," incorporated herein by reference.

STATEMENT OF GOVERNMENT INTEREST

The invention described herein may be manufactured and used by or for the Government of the United States of America for governmental purposes without payment of any royalties thereon or therefore.

BACKGROUND OF THE INVENTION

This invention relates to multilevel switching component rectifiers, and more particularly to a multilevel rectifier with fewer switching components than known multilevel rectifiers. The invention is valid for any number of phases and at least three levels.

The general trend in power electronics is to switch power semiconductors at increasingly high frequencies in order to minimize harmonics and reduce passive component sizes. However, the increase in switching frequency increases switching losses, which become significant at high power levels. Two methods for decreasing switching losses, and at the same time improving power quality, that have been proposed are constructing resonant converters and multi-level converters.

Resonant converters avoid switching losses by adding an LC resonant circuit to the hard switched inverter topology. The inverter transistors can be switched when their voltage or current is zero, thus mitigating switching losses. Examples of this type of converter include the resonant DC link, and the Auxiliary Resonant Commutated Pole inverter (ARCP). One disadvantage of resonant inverters is that the added resonant circuitry will increase the complexity and cost of the converter control. Furthermore, high IGBT switching edge rates can create switch level control problems.

Multi-level converters offer another approach to providing high power quality. One of the primary advantages of multilevel converters are the high number of switching states offered so that the output voltage can be "stepped" in smaller increments thereby producing better voltage waveforms. This allows mitigation of harmonics at low switching frequencies thereby reducing switching losses. In addition, EMC concerns are reduced through the lower common mode current facilitated by lower dv/dt's produced by the smaller voltage steps as well as reducing the switching dv/dt stresses allowing for potentially longer component life. One significant disadvantage of these techniques is that they require a high number of switching devices thereby increasing the cost and complexity of these circuits. Although the devices are rated at a lower voltage, gate drive and control circuitry must still be provided. Another disadvantage of multi-level inverters is that they must be supplied from isolated DC voltage sources or a bank of series capacitors with balanced voltages. In systems where isolated DC sources are not practical, capacitor voltage balancing becomes the principal limitation for multi-level converters. One possible solution to the voltage balancing problems inherent in multilevel converters is described in U.S. Pat. 6,031,738, Lipo et al.

U.S. Pat. No. 5,644,483, Peng et al., which is hereby incorporated by reference, describes a multilevel converter system. The number of switching devices needed in the converter is determined by the equation $m_s=2(m-1)$, where $m_s$ is the number of switching devices needed for each phase leg of the converter and m is the number of converter voltage levels. This equation is valid for both the rectifier and the inverter of the converter system. Indeed, the symmetrical configuration of the converter system described allows it to accept bi-directional power flow. However, as can be readily seen by the equation the number of switching devices increases significantly as the number of voltage levels increases, thereby increasing the cost and complexity of the system.

An example of a three-level rectifier with reduced numbers of switching devices was presented in Y. Zhao, Y. Li, and T. A. Lipo, "Force Commutated Three Level Boost Type Rectifier," *IEEE Transactions on Industry Applications,* vol. 31, no. 1, pp. 155–161, January–February 1995. This three level reduced parts rectifier is illustrated in and will be discussed with reference to FIG. 1A. Therein, one rectifier phase (phase x) and the capacitor bank are shown. The other phases have an identical structure. The general idea behind this topology was a re-arrangement of IGBT's 102 and 103 and diodes 104 and 106 in a standard thee-level rectifier to obtain the circuit shown in FIG. 1A. The performance of this circuit and that of the present invention is identical for their respective three level topologies. However, there is an important difference when the number of voltage levels is increased beyond three.

Although not disclosed by Zhao et al., the reduced parts count topology in FIG. 1A may be extended to rectifiers with a higher number of voltage levels such as the four-level topology illustrated in FIG 1B. For the four-level circuit shown in FIG. 1B, the inner most IGBT's 103 require a rating of $(2/3)v_c$, where $v_c$ is the sum of all of the voltage level capacitor 108 voltages represented by the equation $v_c=v_{c1}+v_{c2}+v_{c3}$. Whereas the outer most IGBT's 102 require a voltage rating of $(1/3)v_c$. This imbalance of voltage ratings precludes the use of dual IGBT modules in this topology. For low voltage applications this imbalance does not pose a significant problem. However, for high-voltage applications, it may be necessary to use two IGBT's in series for the high-voltage IGBT's. However, this approach increases the parts count to that of a fully active four-level rectifier. Thus, for low voltage applications this method can result in a simpler lower cost rectifier. However, the performance is limited as the number of voltage levels increases and several different component ratings are required yielding no parts savings in high voltage applications.

It is desirable to provide a multilevel rectifier with a reduced number of switching devices to reduce the cost and complexity of converter systems with a high number of voltage levels and phases that is suitable for high voltage applications.

SUMMARY OF THE INVENTION

A multilevel uni-directional power converter system including a multilevel rectifier that has a reduced number of switching devices is provided. The system comprises an input to a multilevel rectifier with at least one phase leg. The rectifier is composed of switching device and anti-parallel diode pairs and clamping diodes. The number of switching devices required depends on the given number of voltage levels according to the equation 2(n−1) where n is the number of voltage levels. This number of required devices is then reduced in accordance with the present invention by removing the top and the bottom switching devices from the rectifier circuit. The anti-parallel diodes remain in the rectifier circuit. There is no performance degradation from this reduction in the number of switching devices to the rectifier. The clamping diodes separate the switching devices from the output nodes. The output nodes are joined through a group of series connected capacitors that serve as the input source for a multilevel inverter. The multilevel inverter has the requisite number, 2(n−1), of switching devices for the given number of voltage levels. The multilevel inverter has a set of outputs that supply the conditioned power to a load. Control of the switching for the rectifier is achieved through hysteresis current control and redundant state selection with feedback from the capacitor bank. Control of the multilevel inverter is achieved through redundant state selection regulated by duty-cycle modulation.

Additionally a method for reducing the required number of switching devices in a multilevel rectifier is provided for any given number of levels and phases. The method comprises designing a traditional n-level rectifier, where n is the number of voltage levels, and then removing the top and bottom switching devices from each phase leg of the rectifier circuit. This method does not result in any appreciable performance loss for the circuit. An important design consideration is that this method will only work for unidirectional power flow (AC to DC).

Additional advantages of the invention will be set forth in the description which follows, and will in part be obvious from the description and drawings, or may be learned from practicing the invention.

DESCRIPTION OF THE PREFERRED EMBODIMENTS

Figure 1:
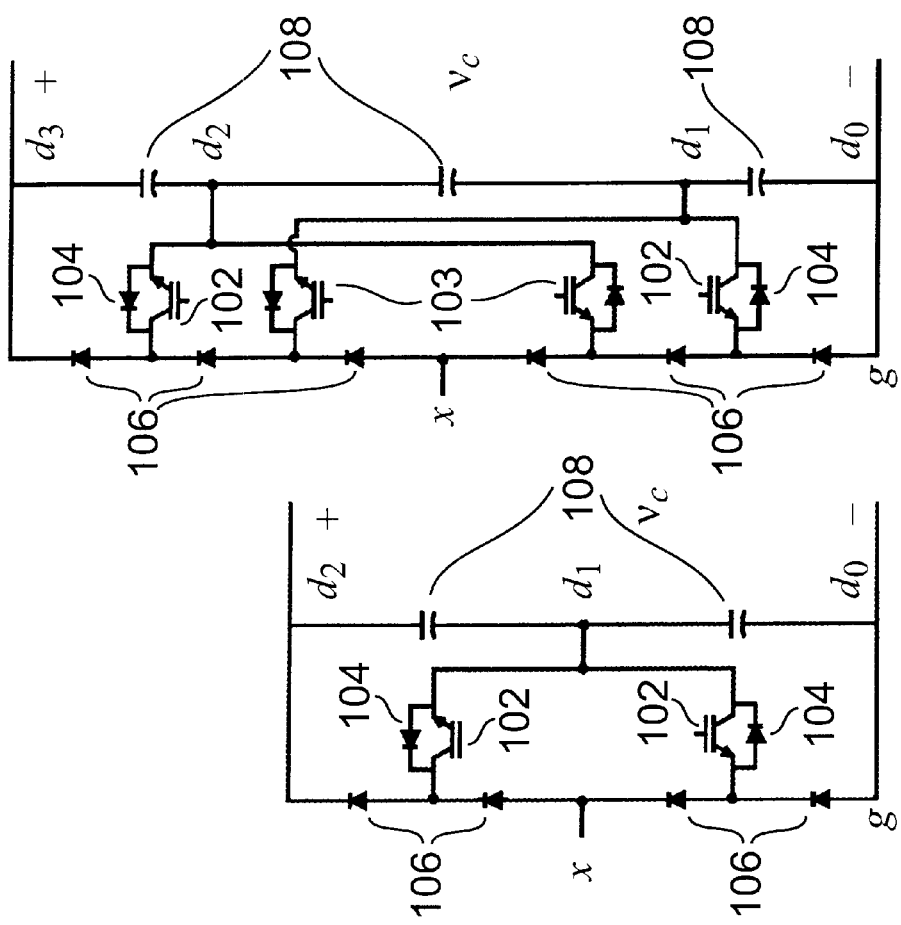
FIG. 1A is a prior art three level reduced parts count rectifier.
FIG. 1B is an extension of the prior art three level reduced parts count rectifier to four levels.
Figure 2:
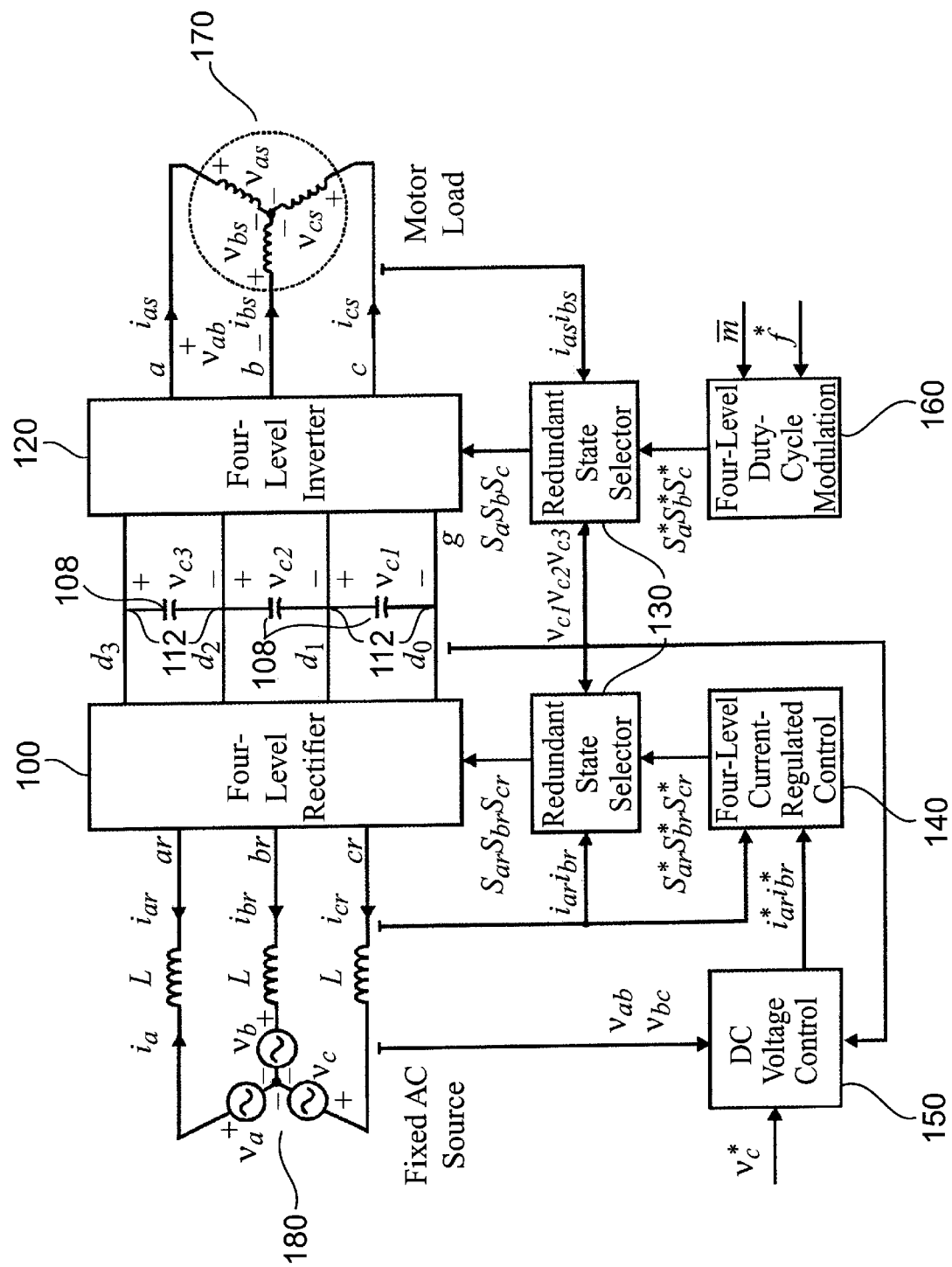
FIG. 2 is a block diagram of a multilevel converter system incorporating a reduced parts count multilevel rectifier in accordance with the invention.

Reference to the drawings will be made to describe the preferred embodiments of the present invention. FIG. 2 is a functional block diagram of a converter system. The fixed frequency AC source 180 and input inductors may represent a utility grid or a synchronous generator on a Naval ship power system. The four-level rectifier 100 and associated control 130, 140, and 150 ensures that the capacitor 108 DC voltages $v_{c1}$, $v_{c2}$, and $v_{c3}$ are identical. With these voltages balanced, the four-level inverter 120 and associated control 130 and 160 can properly supply the induction motor 170 with high power quality waveforms.

Figure 3:
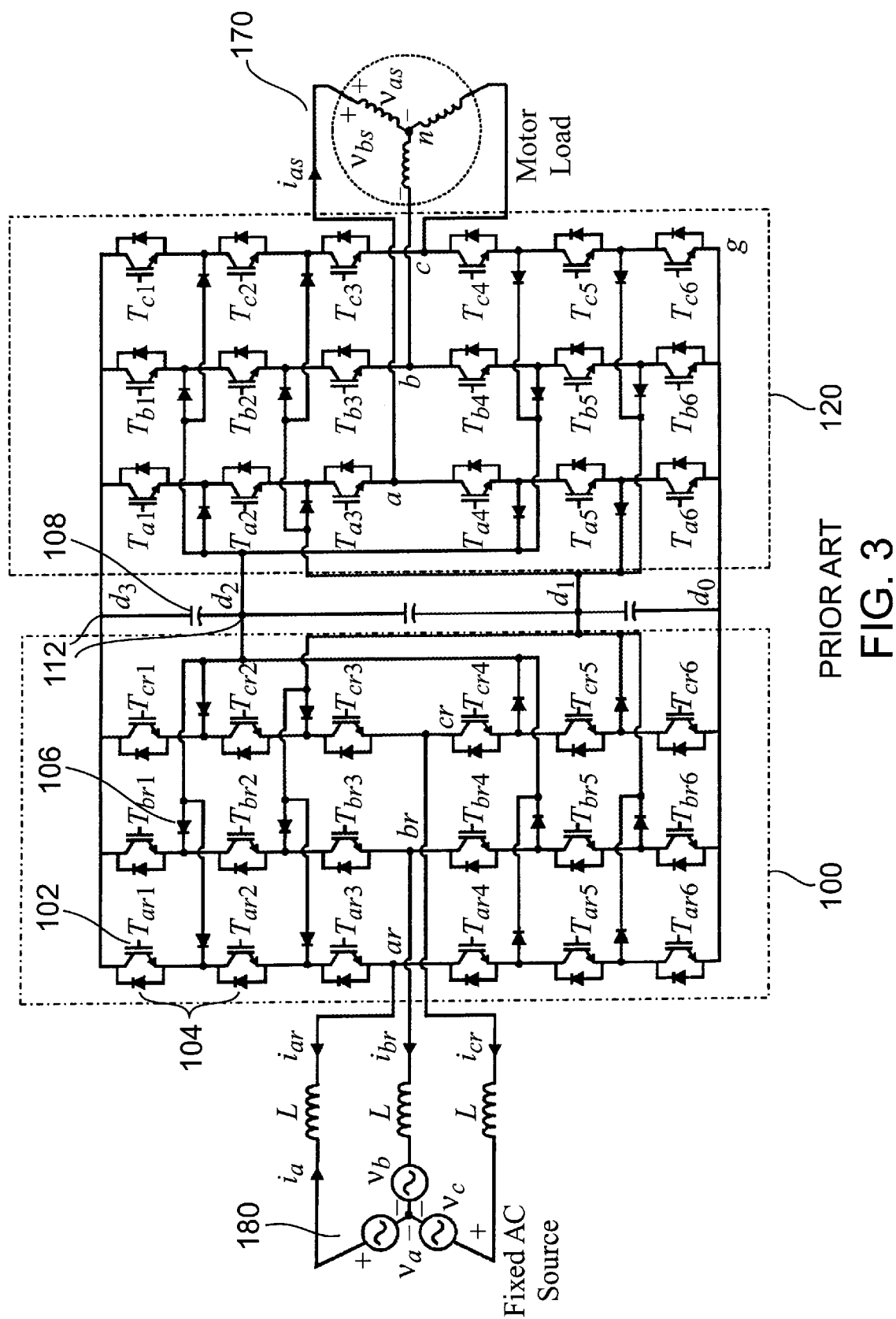
FIG. 3 is a schematic diagram of a prior art fully active four level rectifier/inverter.
Figure 4:
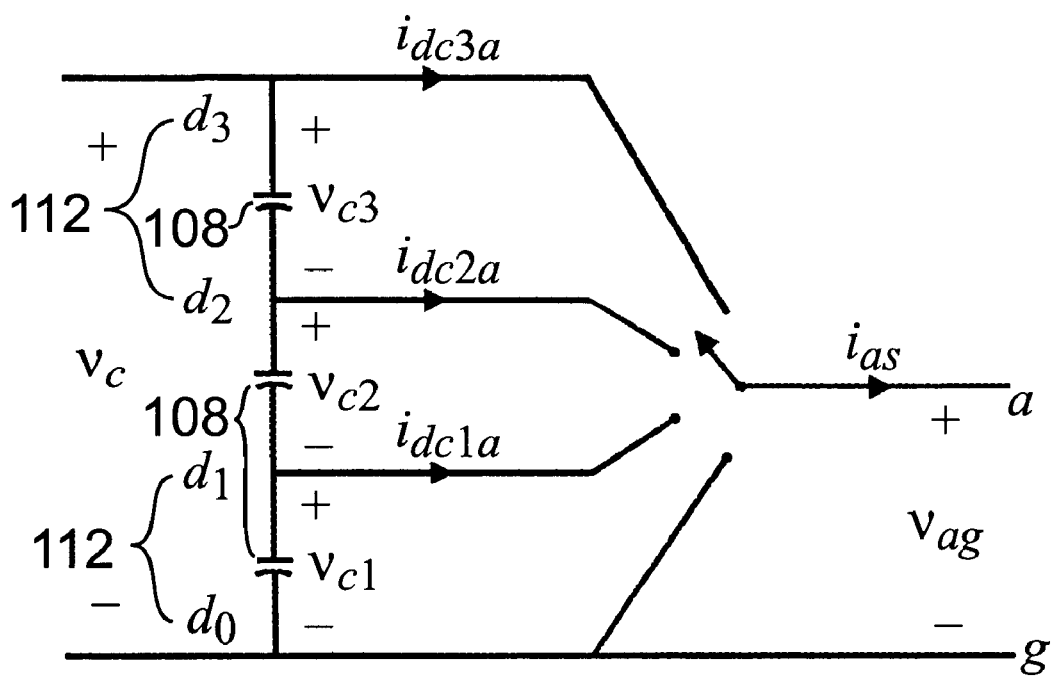
FIG. 4 is a schematic representation of the equivalent switch states for a four-level inverter.

Herein, the term converter will be used generically to describe any power electronic conversion device. Specific terms such as rectifier or inverter are used to specify a particular converter. U.S. Pat. No. 4,270,163, Baker, taught how to achieve multilevel inverters of four or more levels by adding switching devices with anti-parallel diodes in pairs on an upper and lower end of the phase leg along with clamp diodes. FIG. 3 shows one topology for a four-level inverter 120/rectifier 100 (identical components not separately labeled for clarity). Despite the high number of switching devices 102, the power converter operation is fairly straightforward. Each phase of the inverter 120 can be connected to the junctions 112 $d_0$, $d_1$, $d_2$, or $d_3$ through suitable switching of the inverter transistors 102. The resulting operation is similar to that of a positional switch as shown in FIG. 4 for the inverter 120 a-phase.

A fully active four-level rectifier 100 structure is identical to that of the four-level inverter 120 as illustrated in FIG. 3. As with the inverter 120, the phases may be connected to any of the capacitor 108 junctions 112 $d_0$, $d_1$, $d_2$, or $d_3$ through switching of the transistors 102. For a fully active four-level rectifier 100 the number of switching devices 102 required per phase leg can be calculated by the equation, $n_s=2(n-1)$, yielding a total of 6 for four-levels. This would result in a total of 18 switching devices required for a three-phase system. Each switching device, or transistor, 102, is paired with an anti-parallel diode 104. Additionally, clamping diodes 106 are required to allow connection of the phase to the capacitor junctions 112. The system as a whole will be discussed in greater detail in an example demonstrating the performance of the reduced parts count rectifier in accordance with the invention.

Figures 5A, 5B:
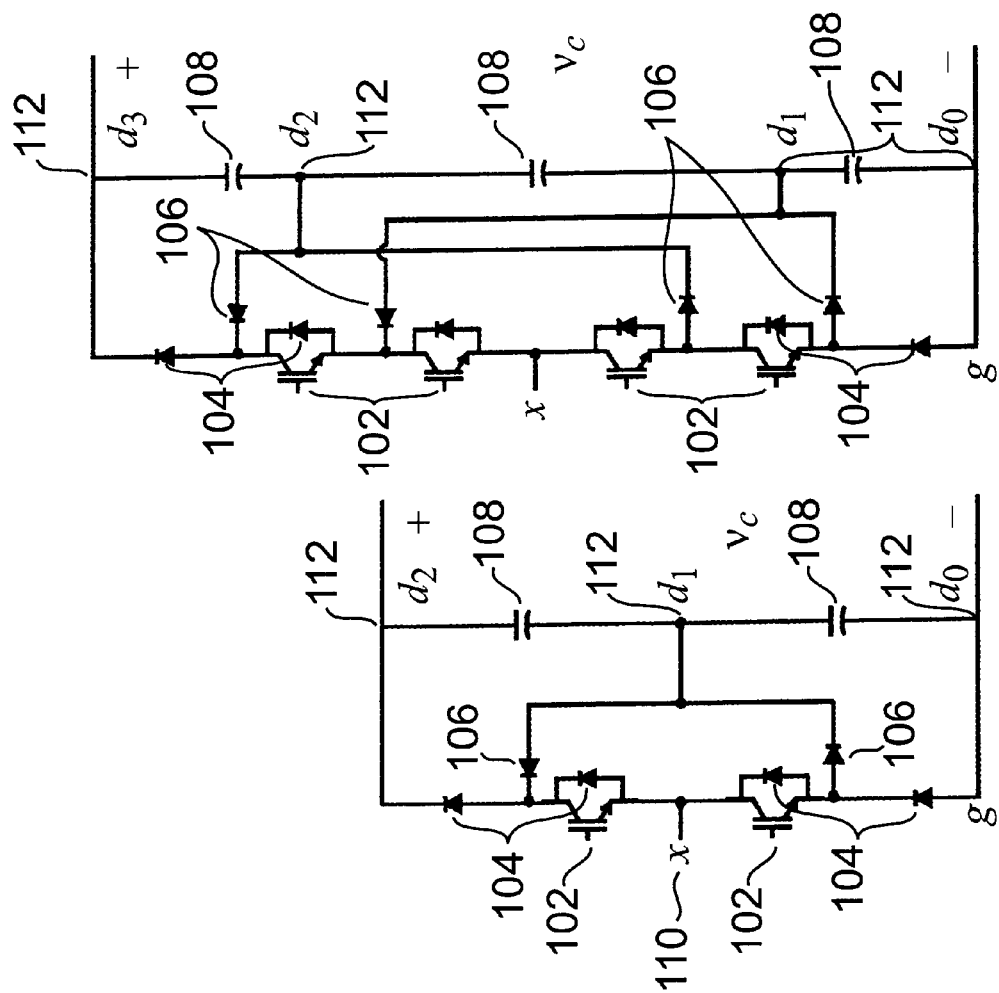
FIG. 5A is a schematic diagram of one phase leg of a three level reduced parts count rectifier in accordance with the invention.
FIG. 5B is a schematic diagram of one phase leg of a four level reduced parts count rectifier in accordance with the invention.

FIGS. 5A and 5B illustrate the preferred embodiment of one phase leg of a three and four level reduced parts count rectifier according to the present invention. As can be seen there is a savings of two switching devices 102 per phase leg compared to a fully active n-level rectifier, where n is any positive integer greater than 3. In order to achieve the new topology the top and bottom switching devices 102 are removed from each phase leg of a fully active multilevel rectifier/inverter, such as the four-level rectifier 100 depicted in FIG. 3, and the anti-parallel diodes 104 remain in the circuit. This methodology, removal of the top and bottom switching device 102 and leaving the anti-parallel diode 104, will work for any number of levels and phases. However, the performance limitation becomes less severe as the number of levels increases. Additional phase legs would have identical structures.

Table 1 illustrates the semiconductor savings for a three-phase system.

TABLE 1

Number of rectifier switching components.

| Voltage Levels | Fully-Active Rectifier | Reduced-Parts Count Rectifier |
|---|---|---|
| 3 | 12 | 6 |
| 4 | 18 | 12 |
| 5 | 24 | 18 |
| 6 | 30 | 24 |

As can be seen, the switching device 102 savings effectively allows higher-level operation with the same number of switching devices 102 as a fully active rectifier having a lower number of voltage levels. The savings can be even greater when a system has a larger number of phases. Naval propulsion systems typically involve a large number of phases for redundancy. In such a case, the semiconductor savings is even greater than that presented for a three-phase system. It is important to note that this change in topology will limit the operation of the rectifier to uni-directional power flow, which is suitable for Naval propulsion system applications.

In the preferred four-level topology of the present invention, all of the switching devices 102 and anti-parallel diodes 104 need only be rated at $(1/3)v_c$ whereas the innermost clamping diodes 106 of the phase leg must be rated at of $(2/3)v_c$, where $v_c$ is the sum of all of the capacitor 108 voltages. This 2/3 rating for the clamping diodes 106 is not a significant problem compared to high-voltage transistors 102 since locating high-voltage diodes 106 or series connecting diodes is straightforward. In FIGS. 5A and 5B the switching devices 102 are shown as insulated gate bipolar transistor (IGBTs). However, the reduced parts count circuit topology is valid for other switching devices such as IGCTs and MOSFETs.

EXAMPLE

An 18 kW laboratory test system with the structure shown in FIG. 2 was constructed for rectifier 100 validation. The input source 180 is a 60 Hz source with a line-to-line RMS voltage of $V_{LL}$=421V and input inductance of L=2.7 mH. The rectifier control proportional gain was set to $K_p$=1 A/V and the integral gain was set to $K_1$=10 A/V·sec in order to regulate 150 the DC link voltage to $v_c^*$=660V. Hysteresis current-regulation 140 was implemented on the rectifier with a hysteresis level of $h_3$=1A. The inverter control 160 modulation index was set to $\bar{m}$=0.98 and the inverter frequency command was f*=100 Hz. The induction motor 170 parameters are show in Table 2.

TABLE 2

Induction machine parameters.

| | |
|---|---|
| P = 4 | M = 55 mH |
| $r_s$ = 0.2 ohms | $L_{ls}$ = 1.91 mH |
| $r_r'$ = 0.326 ohms | $L_{lr}'$ = 2.32 mH |

The induction motor 170 is mechanically loaded using a synchronous generator. In the test system reduced parts count rectifier operation was obtained by gating off the upper-most and lower-most IGBT's in the four-level rectifier 100. The inverter 120 line-to-ground voltage for a particular phase is determined from the switching state and capacitor voltages by $$v_{xg} = \sum_{i=0}^{s_x} v_{ci} \quad (1)$$

where x represents the phase and may be a, b, or c. The switching state $s_x$ in (1) is determined by the pulsewidth modulation (PWM) control and has the values 0, 1, 2, or 3 for the four-level inverter. Since the induction motor 170 is wye connected, it can be shown that the motor voltages are related to the inverter line-to-ground voltages by $$v_{as} = \frac{2}{3}v_{ag} - \frac{1}{3}v_{bg} - \frac{1}{3}v_{cg} \quad (2)$$

$$v_{bs} = \frac{2}{3}v_{bg} - \frac{1}{3}v_{ag} - \frac{1}{3}v_{cg} \quad (3)$$

$$v_{cs} = \frac{2}{3}v_{cg} - \frac{1}{3}v_{ag} - \frac{1}{3}v_{bg} \quad (4)$$

In the rectifier 100, as with the inverter 120, the phases ar, br, and cr, may be connected to any of the capacitor junctions 112 $d_0$, $d_1$, $d_2$, or $d_3$ resulting in similar phase-to-ground voltages of $$v_{xrg} = \sum_{i=0}^{s_{xr}} v_{ci} \quad (5)$$

where $S_{xr}$ represents the rectifier phase x switching state. The AC supply voltages are then calculated from $$v_{ar} = \frac{2}{3}v_{arg} - \frac{1}{3}v_{brg} - \frac{1}{3}v_{crg} \quad (6)$$

$$v_{br} = \frac{2}{3}v_{brg} - \frac{1}{3}v_{arg} - \frac{1}{3}v_{crg} \quad (7)$$

$$v_{cr} = \frac{2}{3}v_{crg} - \frac{1}{3}v_{arg} - \frac{1}{3}v_{brg} \quad (8)$$

Voltages (6–8) are defined from the rectifier phases to the neutral connection of the source.

Duty-cycle modulation control 160 is used to regulate the inverter switching states $s_x$ so that the desired motor voltages $v_{as}$, $v_{bs}$, and $v_{cs}$ are obtained. The desired motor phase voltages may be expressed as $$v_{as}^* = \sqrt{2}\, v_s^* \cos(\theta_c) \quad (9)$$

$$v_{bs}^* = \sqrt{2}\, v_s^* \cos\left(\theta_c - \frac{2\pi}{3}\right) \quad (10)$$

$$v_{cs}^* = \sqrt{2}\, v_s^* \cos\left(\theta_c + \frac{2\pi}{3}\right) \quad (11)$$

where $V_s^*$ is the desired RMS voltage magnitude and $\theta_c$ is the desired electrical angle including phase shift which may be expressed as $$\theta_c = \theta_e + \phi_v \quad (12)$$

The electrical angle can be related to a desired electrical frequency by $$\theta_e = 2\pi \int_0^t f^* d\tau \quad (13)$$

It can be seen from (1), that the PWM switching has direct control of the inverter line-to-ground voltages $v_{ag}$, $v_{bg}$, $v_{cg}$. However, from (2–4) it can be seen that it is not possible to directly solve for commanded line-to-ground voltages from commanded motor phase voltages. This is the case since zero sequence components of $v_{ag}$, $v_{bg}$, and $v_{cg}$ will cancel in (2–4). In the three-phase test system, the zero sequence components of $v_{ag}$, $v_{bg}$, and $v_{cg}$, include DC offset and any triplen harmonics of $\theta_c$. Adding a certain amount of third-harmonic content to the line-to-ground voltages can maximize the inverter 120 output voltage. In particular, maximum inverter voltage utilization is achieved if the commanded line-to-ground voltages are set to $$v_{ag}^* = \frac{v_c}{2}\left[1 + m\cos(\theta_c) - \frac{m}{6}\cos(3\theta_c)\right] \quad (14)$$

$$v_{bg}^* = \frac{v_c}{2}\left[1 + m\cos\left(\theta_c - \frac{2\pi}{3}\right) - \frac{m}{6}\cos(3\theta_c)\right] \quad (15)$$

$$v_{cg}^* = \frac{v_c}{2}\left[1 + m\cos\left(\theta_c + \frac{2\pi}{3}\right) - \frac{m}{6}\cos(3\theta_c)\right] \quad (16)$$

where $v_c$ is the sum of the capacitor 108 voltages $$v_c = v_{c1} + v_{c2} + v_{c3} \quad (17)$$

and m is the modulation index having a range of $$0 \leq m \leq \frac{2}{\sqrt{3}} \quad (18)$$

It is often convenient to define a modulation index that has a range from 0 to 100% by $$\bar{m} = \frac{\sqrt{3}}{2} m \quad (19)$$

The motor phase voltage resulting from the commanded line-to-ground voltages can be determined by substituting (14–16) into (2–4) yielding $$v_{as} = \frac{m v_c}{2} \cos(\theta_c) \quad (20)$$

$$v_{bs} = \frac{m v_c}{2} \cos\left(\theta_c - \frac{2\pi}{3}\right) \quad (21)$$

$$v_{cs} = \frac{m v_c}{2} \cos\left(\theta_c + \frac{2\pi}{3}\right) \quad (22)$$

By comparing (20–22) to (9–11), it can be seen that the commanded voltages are obtained if the modulation index is set to $$m = \frac{2\sqrt{2}\, v_s^*}{v_c} \quad (23)$$

PWM switching is accomplished by defining duty-cycles based on the normalized commanded line-to-ground voltages, which may be expressed as $$d_a = \frac{1}{2}\left[1 + m\cos(\theta_c) - \frac{m}{6}\cos(3\theta_c)\right] \quad (24)$$

$$d_b = \frac{1}{2}\left[1 + m\cos\left(\theta_c - \frac{2\pi}{3}\right) - \frac{m}{6}\cos(3\theta_c)\right] \quad (25)$$

$$d_c = \frac{1}{2}\left[1 + m\cos\left(\theta_c + \frac{2\pi}{3}\right) - \frac{m}{6}\cos(3\theta_c)\right] \quad (26)$$

The inverter 120 switching states $s_x$ may be determined by comparing the duty-cycles to multiple triangle waveforms. Alternatively, it is possible to utilize a digital signal processor (DSP) implementation in which definition of the triangle waveforms is not necessary. As an example, consider the a-phase switching state. The first step is to integerize the duty cycle to determine the nearest switching states.

$$l_a = INT(3 d_a) \quad (27)$$

where INT is the integerization function which will return the nearest integer less than or equal to its argument. The nearest switching states are then $s_a = l_a$ and $s_a = l_a + 1$. If the clock frequency of the controller is $T_s$, then the a-phase switching states for one DSP cycle are $$s_a = \begin{cases} l_a + 1, & 0 \leq t < t_a \\ l_a, & t_a \leq t \leq T_s \end{cases} \quad (28)$$

where $$t_a = (3 d_a - l_a) T_s \quad (29)$$

The b- and c-phase switching states are computed in a similar manner. Typically, the switching frequency is set to roughly one hundred times the fundamental frequency ($1/T_s > 100 f^*$).

The multi-level hysteresis current-regulator 140 is based on defining a set of n−1 hysteresis levels; n being the number of converter voltage levels. Denoting the maximum allowable excursion of the actual current from the desired current as the largest hysteresis level $h_{(n-1)}$, the remaining n−2 hysteresis levels are computed from $$h_j = \frac{j}{n-1} h_{(n-1)} \quad j = 1, 2, \ldots, (n-2) \quad (30)$$

For the tested rectifier 100, n=4 and thus three hysteresis levels are defined. The current error for a particular phase defined by $$i_{xrerr} = i_{xr}^* - i_{xr} \tag{31}$$

Figure 6:
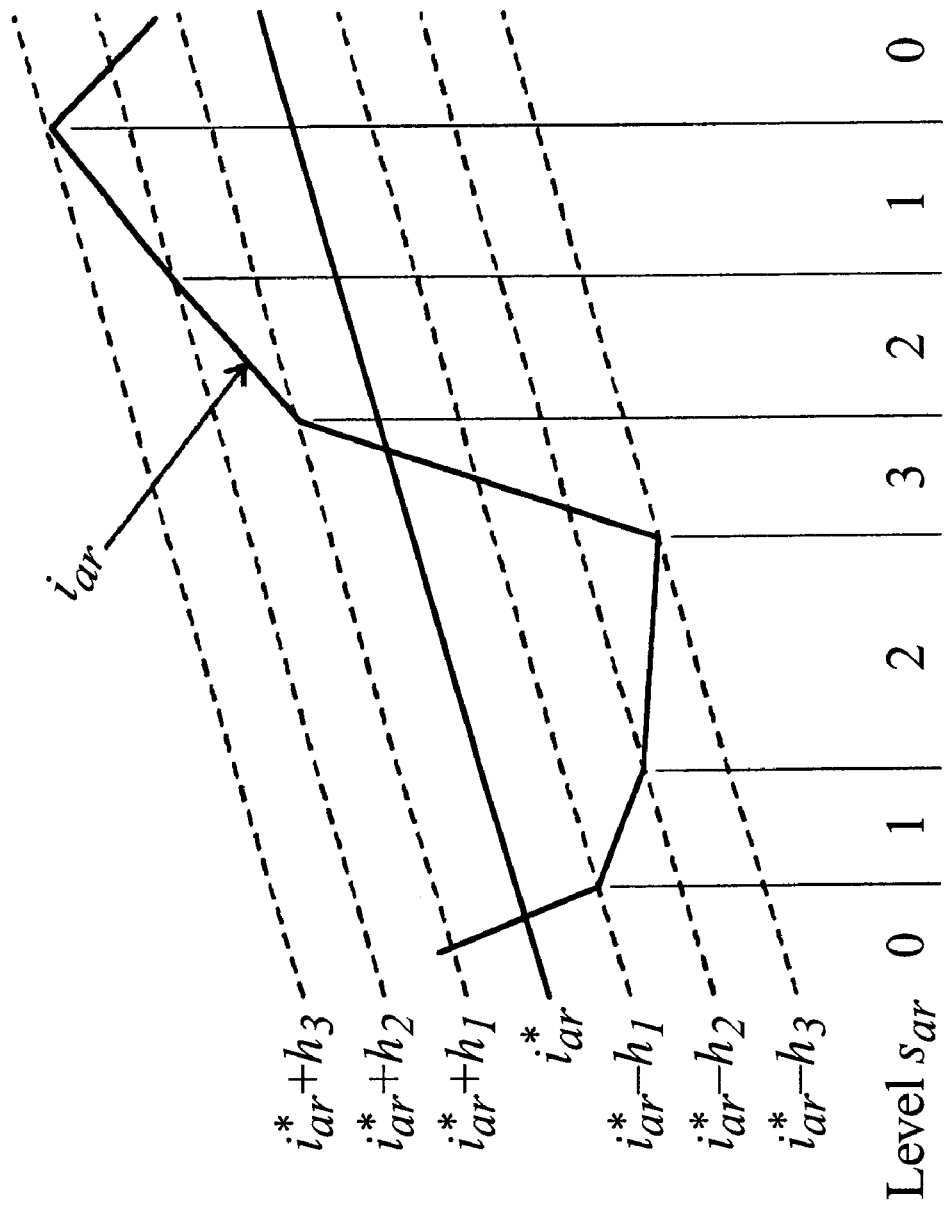
FIG. 6 is a graph of an example reference current and a-phase current for a four-level rectifier utilizing current hysteresis control.

When the current error is positive, the controller 140 decreases the level of phase x by one each time the error crosses a hysteresis level. Likewise, the phase level is increased when the current error is negative and crosses a hysteresis level. FIG. 6 shows an example reference current and a-phase current for the four-level rectifier. The a-phase voltage level is shown to illustrate the converter switching. As can be seen, the primary goal of the hysteresis switching is to regulate the current. Capacitor 108 voltage balancing is achieved through redundant state selection 130.

Figure 7:
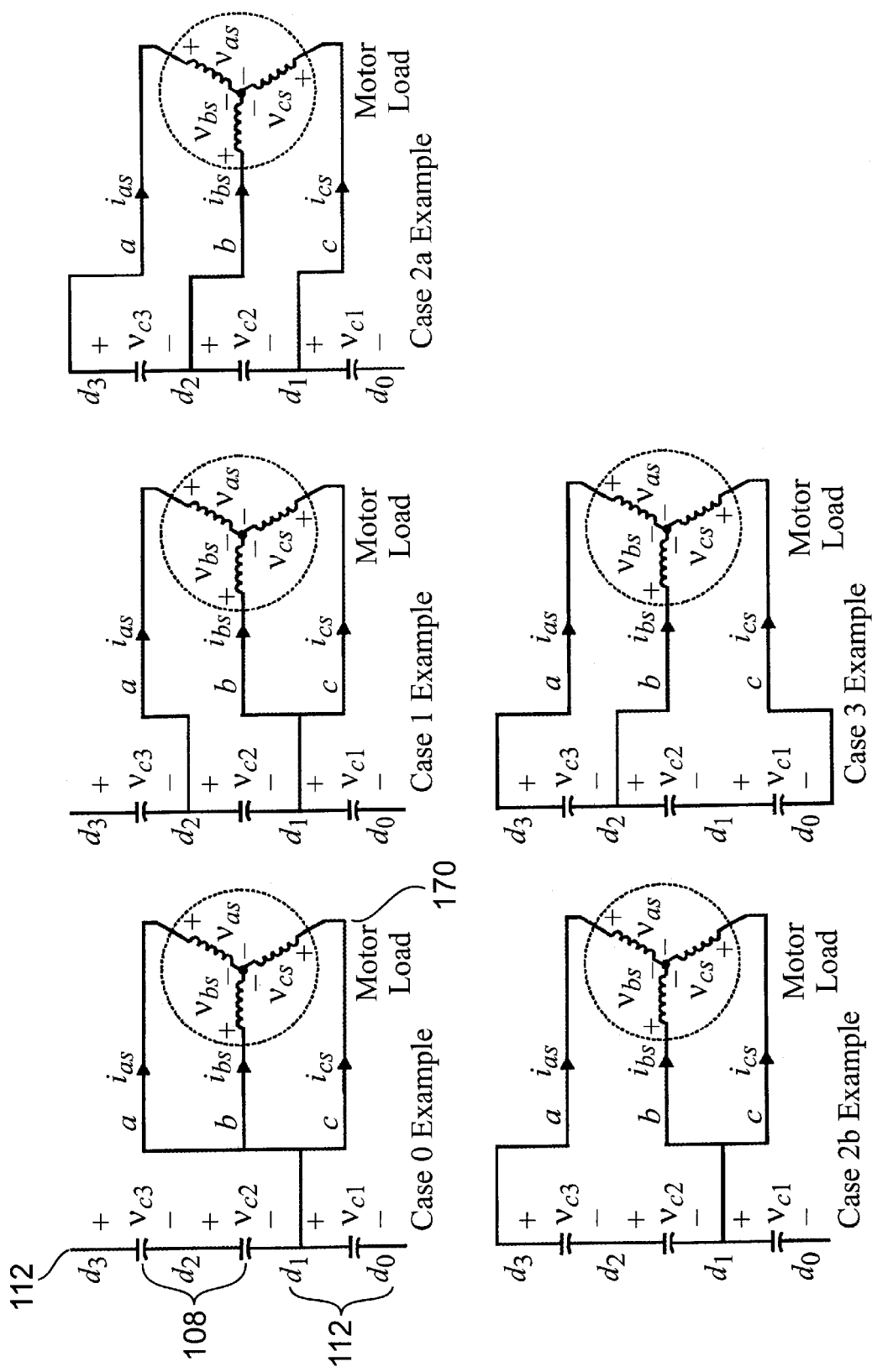
FIG. 7 is a group of functional schematic diagrams of the cases depicting the redundant switching states for a four level rectifier.

In order for the four-level power conversion processes (rectifier and inverter) to operate properly, the voltages on all three capacitors 108 must be equal. However, current drawn from the middle junctions 112 $d_1$ and $d_2$ will tend to unbalance the capacitor voltages. Assuming that the capacitor voltage error is small, redundant switching states can be used which result in the same AC load voltages but have different effect on the charging and discharging of the capacitors 108. For the four-level inverter 120, the problem may be reduced to four cases defined by the number of capacitors 108 that the phases are connected across. FIG. 7 shows examples of the four cases. The redundant switching states of these cases may be found by incrementing or decrementing the switching states of all three phases. For example, case 0 is obtained by setting ($s_a$=1, $s_b$=1, $s_c$=1). The induction motor voltages will be the same if the redundant states ($s_a$=0, $s_b$=0, $s_c$=0) or ($s_a$=2, $s_b$=2, $s_c$=2) or ($s_a$=3, $s_b$=3, $s_c$=3) are used. However, for case 0, the redundant states do not change the currents drawn from the capacitor junctions. Therefore, redundant state selection is not applied to case 0. From FIG. 7, it can be seen that the switching state ($s_a$=2, $s_b$=1, $s_c$=1) will charge or discharge capacitor voltage $v_{c2}$ depending on the direction of the a-phase current. This is an example of case 1 where the phases are connected across one capacitor 108. If the a-phase current is positive the phases will tend to discharge the capacitor 108 and the phases should be connected across the capacitor 108 with the highest voltage by selecting between the appropriate redundant states which in this example are ($s_a$=1, $s_b$=0, $s_c$=0) and ($s_a$=3, $s_b$=2, $s_c$=2). If the a-phase current is negative, the phases should be connected across the capacitor 108 with the lowest voltage. There are two ways in which the phases may span two capacitors 108. These are shown in FIG. 7 as case 2a and case 2b. As can be seen, case 2a has the potential to change the voltages on any capacitor 108. A decision about the most appropriate redundant state for this case should be based on the primary goal of controlling the voltage $v_{c2}$ and a secondary goal of controlling the voltages $v_{c1}$ and $v_{c3}$. The purpose of these goals is that the connection of the motor phases to the capacitor junctions 112 will tend to discharge the center capacitor 108 when commanding high load voltage. From the example shown in FIG. 7, it can be seen that the c-phase current direction will determine the center capacitor 108 charge or discharge for the state shown ($s_a$=3, $s_b$=2, $s_c$=1). For the redundant state ($s_a$=2, $s_b$=1, $s_c$=0), the a-phase current will depict the capacitor charge or discharge. In the event that neither state improves the center capacitor voltage balance, the decision is made based on capacitor voltages $v_{c1}$ and $v_{c3}$. Case 2b in FIG. 7 will not assist in controlling the center capacitor voltage since the state shown $s_a$=3, $s_b$=1, $s_c$=1) and the redundant state ($s_a$=2, $s_b$=0, $s_c$=0) have the same charging or discharging effect on $v_{c2}$. In this case, the redundant state could be used to balance the capacitor voltages $v_{c1}$ and $v_{c3}$. However, this imbalance is typically not a difficulty and redundant state selection in this case will only increase the switching frequency. There are no redundant states that correspond to case 3 and therefore redundant state selection is not applied.

All cases discussed above can be analyzed off-line and programmed as a table into an erasable programmable read only memory (EPROM) or programmable logic device (PLD). Based on the desired switching state ($s_a^*$, $s_b^*$, $s_c^*$), the direction of the phase currents, and the capacitor 108 voltages, the memory or logic device will select the appropriate state. The redundant state selector 130 for the four-level rectifier 100 is identical to that of the inverter 120.

The overall DC link voltage $v_c$ is regulated through standard synchronous current regulation 150. The source voltages may be described by $$v_a = \sqrt{\frac{2}{3}} V_{LL} \cos(\theta_u) \tag{32}$$

$$v_b = \sqrt{\frac{2}{3}} V_{LL} \cos\left(\theta_u - \frac{2\pi}{3}\right) \tag{33}$$

$$v_c = \sqrt{\frac{2}{3}} V_{LL} \cos\left(\theta_u + \frac{2\pi}{3}\right) \tag{34}$$

where $\theta_u$ is defined as the voltage source electrical angle or 'utility' angle. Transformation to the utility reference frame yields a q-axis voltage equal to the peak phase voltage and a d-axis voltage equal to zero. For unity power factor operation, it is necessary to command the d-axis rectifier current to zero. The q-axis current can be used to regulate the DC link voltage resulting in commanded currents of $$i_{qr}^{u*} = -K_p e_v - K_i \int_0^t e_v d\tau \tag{35}$$

and $$i_{dr}^{u*} = 0 \tag{36}$$

where $e_v$ is the DC voltage error defined by $$e_v = v_c^* - v_c \tag{37}$$

The inverse transformation necessary to determine $i_{ar}^*$, $i_{br}^*$, and $i_{cr}^*$ relies on knowledge of the input electrical position $\theta_u$. Methods for aligning the transformation to this reference frame include using a phase locked loop, voltage sensors, or an on-line observer. The four-level preferred embodiment used the voltage sensor method. These sensors have the advantage of straightforward and accurate implementation and relatively low-cost. Helpful transformation terms may be directly computed from the measured voltages as $$\cos\left(\theta_u + \frac{\pi}{6}\right) = \frac{v_{ab}}{\sqrt{2} V_{LL}} \tag{38}$$

$$\cos\left(\theta_u - \frac{\pi}{2}\right) = \frac{v_{bc}}{\sqrt{2} V_{LL}} \tag{39}$$

All necessary transformation terms can be determined from these terms using trigonometric identities. Harmonics in the line voltages will appear in the sensor outputs, but may eliminated using a low-pass filter in hardware or software. Compensation for the filter amplitude attenuation and phase delay can be incorporated in the control 150 software since the source frequency is known and the source magnitude can be determined through sensor information.

Figure 8:
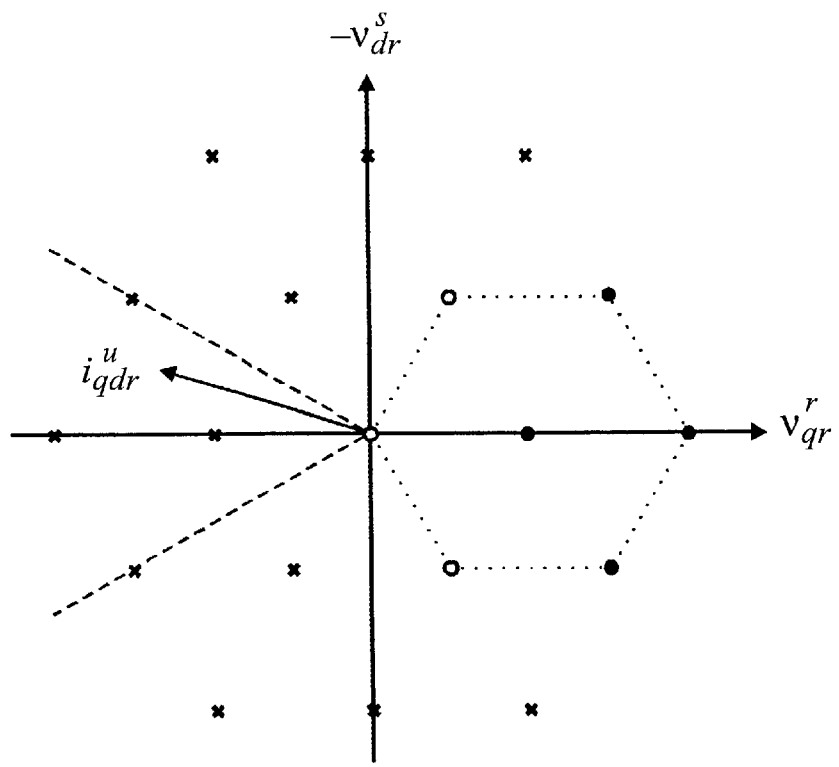
FIG. 8 is a vector plot of the rectifier voltage vectors for a reduced-parts count three-level rectifier.

With respect to reduced parts count rectifiers FIGS. 5A and 5B, the primary concern is the limitation on performance due to the reduced number of switching devices 102. This is usually a function of the power factor on the input and can be evaluated by plotting the rectifier voltage vectors obtainable by transforming (6–8) to the stationary reference frame. FIG. 8 shows the rectifier voltage vectors for the three-level reduced parts count rectifier. The current vector in the utility reference frame is also shown on the vector plot. This is obtained by transforming the rectifier currents $i_{ar}$, $i_{br}$, and $i_{cr}$ to the utility reference frame and then defining the vector as $$i_{qdr}^u = i_{qr}^u - j i_{dr}^u \tag{40}$$

Figure 9:
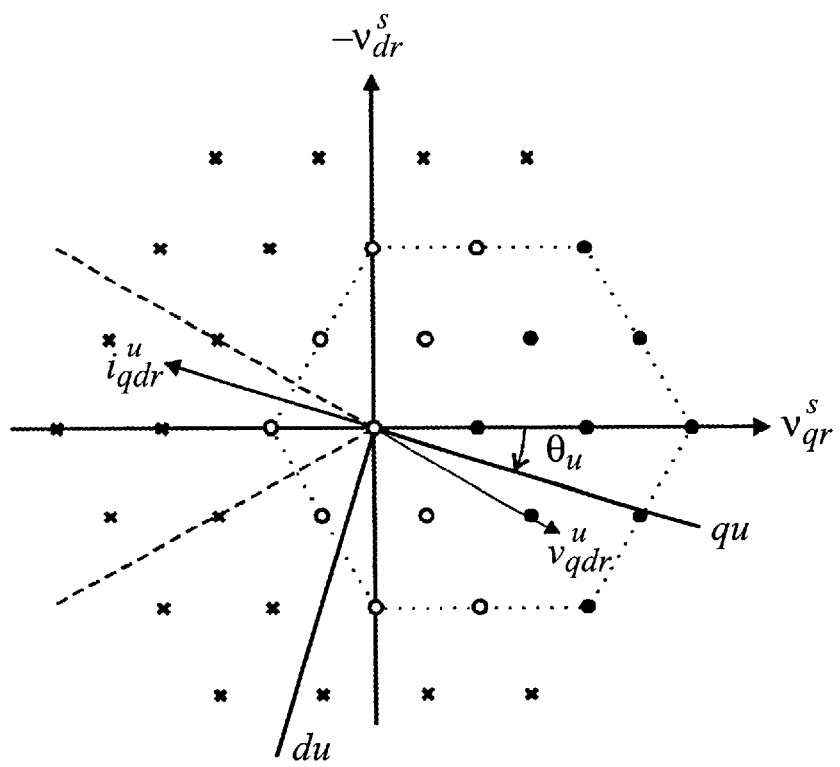
FIG. 9 is a vector plot of the rectifier voltage vectors for a reduced-parts count four-level rectifier.
Figure 10:
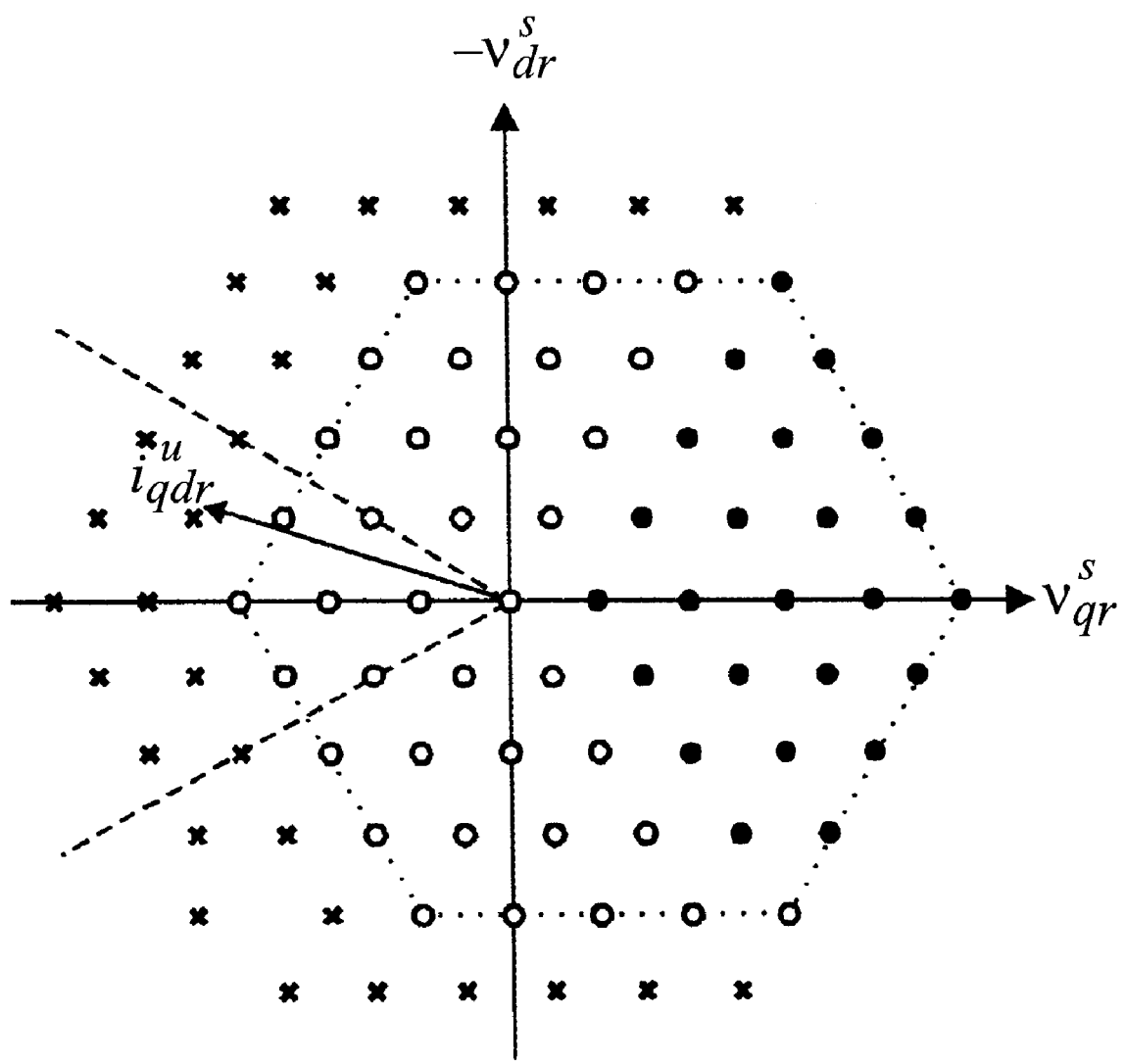
FIG. 10 is a vector plot of the rectifier voltage vectors for a reduced-parts count six-level rectifier.

Consider the case where the current vector lies between the dashed lines as shown in FIG. 8. In this case, the a-phase current is negative and the lowest voltage level is not available in this phase due to the absence of the switching device 102. Likewise, the b- and c-phase currents are positive which excludes the highest voltage level for theses phases. For this reason, the voltage vectors marked with an x are not available when the current vector is in this region. The remaining voltage vectors are available for use by the modulation. However, all redundant states are not available for the vectors indicated by the open circles. The resulting area available for voltage synthesis is indicated by the dotted hexagon. FIGS. 9 and 10 show similar voltage vector plots for four- and six-level reduced parts count rectifiers respectively. As can be seen, a wider area is opened up for voltage synthesis as the number of voltage levels is increased.

In order to determine the limitation imposed on the reduced parts count rectifier, consider the case of the four-level reduced parts count rectifier with the voltage vector plot shown in FIG. 9. Therein, the utility reference frame axes qu and du are included along with the voltage vector $v_{qdr}^u$. In this case, the voltage vector must lie inside the dotted hexagon. The right-most edges of the hexagon are typical limitations due to the DC link voltage. The primary limitation then becomes the bottom-most edge of the hexagon requiring that $$v_{dr}^s \leq \frac{2\sqrt{3}}{9} v_c^* \tag{41}$$

Expressing this limitation as a function of the commanded current is helpful. This is accomplished by transforming the rectifier input voltage and inductance to the utility reference frame. In the steady-state, these equations become $$v_{qr}^u = \omega_u L i_{dr}^u + v_q^u \tag{42}$$

$$v_{dr}^u = -\omega_u L i_{qr}^u + v_d^u \tag{43}$$

In the utility reference frame, $$v_q^u = \sqrt{\frac{2}{3}} V_{LL} \tag{44}$$

$$v_d^u = 0 \tag{45}$$

Since unity power factor is commanded, the d-axis utility reference frame current is set to zero and the q-axis current is regulated to a negative value as per (35–36). Using this information, and transforming the rectifier voltages to the stationary reference frame yields a d-axis voltage of $$v_{dr}^s = -\sqrt{\frac{2}{3}} V_{LL} \sin(\theta_u) - \omega_u L i_{qr}^{u*} \cos(\theta_u) \tag{46}$$

As can be seen from FIG. 9, the worst case operating condition, in terms of violating the voltage constraint, is when $\theta_u = -\pi/6$. Under these conditions, it can be seen from (41) and (46) than the limit on the commanded q-axis current is $$|i_{qr}^{u*}| \leq \frac{1}{\omega_u L} \left[ \frac{4 v_c^*}{9} - \frac{\sqrt{2} V_{LL}}{3} \right] \tag{47}$$

Equation (47) is used to evaluate the suitability of the four-level reduced parts count rectifier under the specific operating conditions given above. Notice that the limit is increased with increasing commanded DC voltage and decreasing input voltage. Furthermore, lower values of line inductance and voltage source frequency will increase the limit on q-axis current.

Based on the parameters and operating conditions of the example system mentioned above, it is determined from (47) that the magnitude of the q-axis current must be limited to 93.2A if a reduced parts count rectifier is used. With this current limitation and unity power factor operation, the rectifier input power is limited to 48 kW, which is more than enough for the 18 kW test load.

Figure 12:
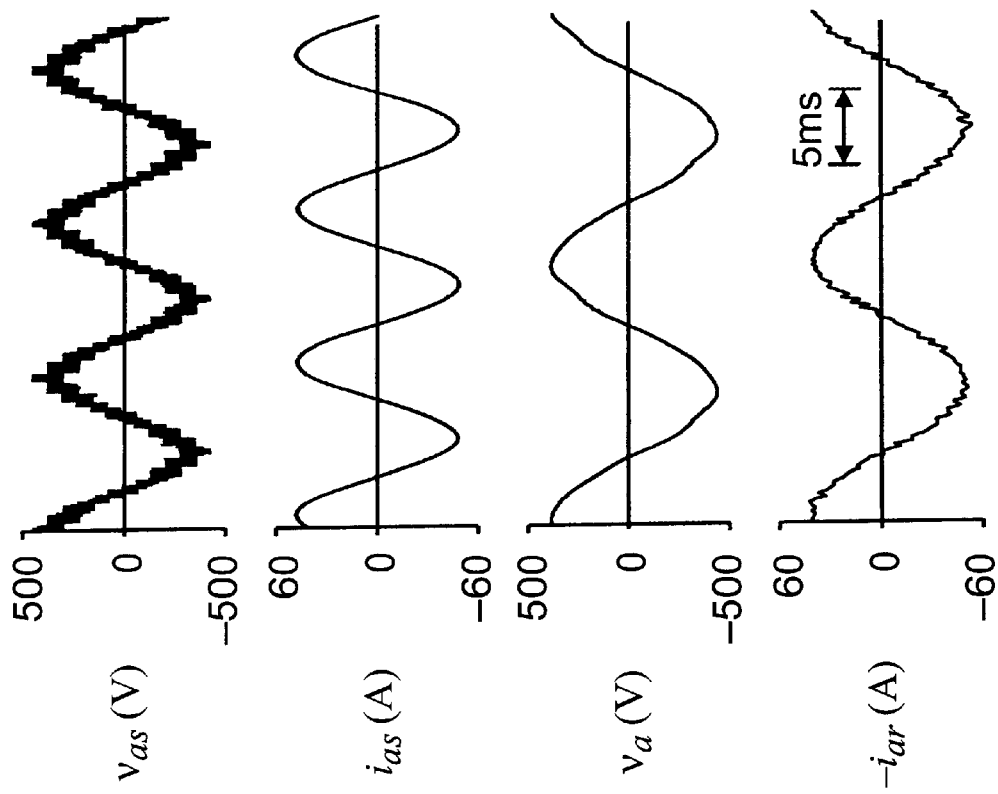
FIG. 12 shows waveform diagrams depicting the steady-state performance of a reduced parts count four-level rectifier in accordance with the invention.
Figure 11:
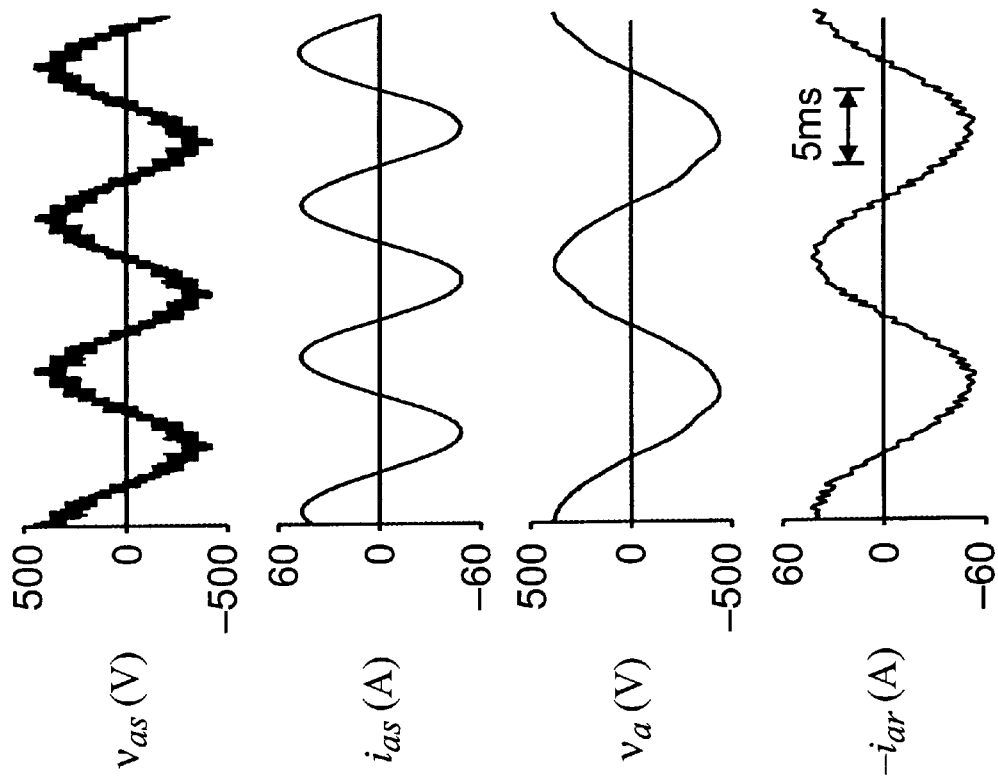
FIG. 11 shows waveform diagrams depicting the steady-state performance of a fully active four-level rectifier.

FIGS. 11 and 12 show the system steady-state performance for the fully active rectifier and reduced parts count rectifier respectively. Therein, the motor phase voltage $v_{as}$, phase current $i_{as}$, source voltage $v_a$, and rectifier current $i_{ar}$ are shown. The rectifier current has been inverted so that unity power factor operation can be readily displayed. As can be seen, the performance of the reduced parts count rectifier is essentially identical to that of the fully active rectifier. Capacitor 108 voltage balance is ensured leading to even voltage steps in the motor phase voltage and high power quality.

Figure 13:
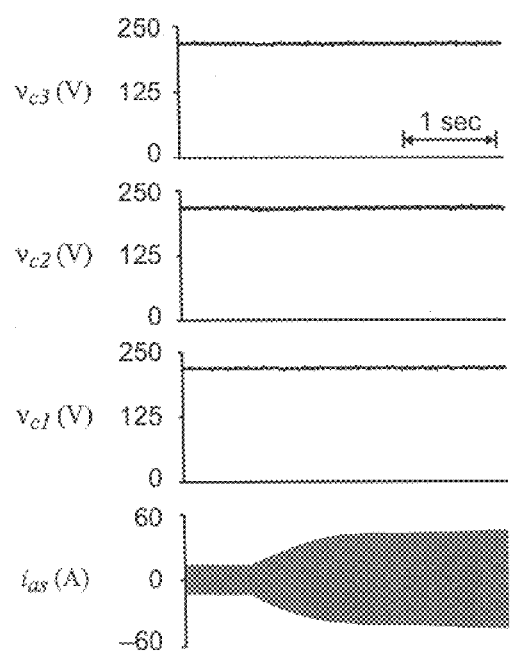
FIG. 13 shows waveform diagrams depicting the performance of a fully active four-level rectifier under a step change in load.
Figure 14:
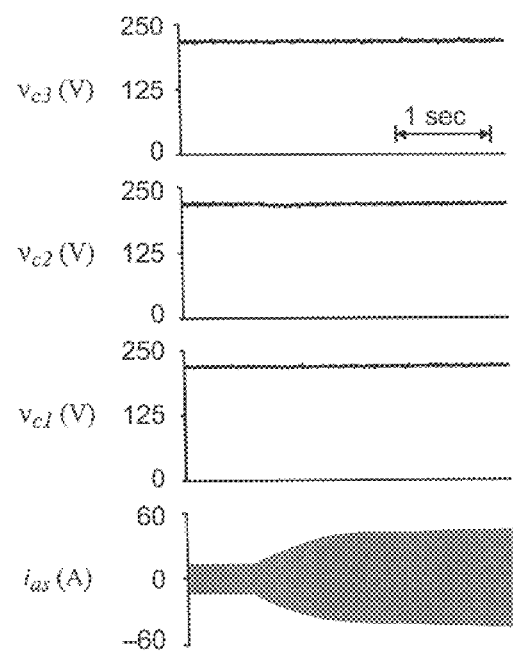
FIG. 14 shows waveform diagrams depicting the performance of a reduced parts count four-level rectifier in accordance with the invention under a step load.

FIGS. 13 and 14 demonstrate the system performance under a step change in load for the fully active rectifier and reduced parts count rectifier respectively. In the test system, the motor load 170 is stepped from no-load to rated operation. The capacitor 108 voltages $v_{c1}$, $v_{c2}$, and $v_{c3}$ as well as the motor 170 current $i_{as}$ are shown. As can be seen, the redundant state selection 130 ensures capacitor 108 voltage balance. The tests verify that the reduced parts count rectifier performs the same as that of the fully active rectifier for the transient case.

What has been described is only a few of many possible variations on the same invention and is not intended in a limiting sense. The claimed invention can be practiced using other variations not specifically described above.

What is claimed is:

1. A reduced parts count multilevel rectifier comprising:
   at least one input node;
   at least one phase leg corresponding to each said input node;
   a plurality of switching device and anti-parallel diode pairs arranged in each said phase leg according to a given number, n, greater than or equal to 4, of voltage levels wherein the number of said switching devices is reduced by removing two switching devices from the circuit but the anti-parallel diodes remain;

at least one clamping diode corresponding to each said remaining switching device and anti-parallel diode pairs;

a plurality of output nodes corresponding to the number of voltage levels; and a plurality of capacitors connected between adjacent said output nodes.

2. A reduced parts count multilevel rectifier as in claim 1, wherein said switching devices are removed from the top and bottom of each said phase leg.

3. A reduced parts count multilevel rectifier as in claim 2 wherein said switching devices are IGBTs.

4. A method for reducing the number of switching devices required in a multilevel rectifier for a given number of voltage levels comprising:

(a) choosing a number, n, of voltage levels desired, where n is at least 4;

(b) choosing the number of phase legs for the rectifier;

(b) designing a standard switching device and clamping diode rectifier based on said n voltage levels and number of phases;

(c) reducing the number of switching devices required by removing two switching devices from said rectifier.

5. A multilevel converter system comprising:

at least one input node;

a multilevel rectifier with at least one phase leg corresponding to and operably connected with each said input node, wherein said multilevel rectifier has fewer switching devices in each said phase leg than a standard multilevel rectifier for a given number of voltage levels, wherein said multilevel rectifier has at least four said voltage levels;

a plurality of rectifier output nodes corresponding to and operably connected with each of said multilevel rectifier phase legs;

a plurality of capacitors corresponding to and operably connected with each of said rectifier output nodes;

a multilevel inverter with at least one phase leg corresponding to and operably connected with each of said capacitors and rectifier output nodes;

at least one load output node corresponding to and operably connected with each said phase leg of said inverter; and control means for said rectifier and said inverter.

6. A method for reducing the number of switching devices required in a multilevel rectifier for a given number of voltage levels comprising:

(a) choosing the number of phase legs for a multilevel rectifier;

(b) choosing a number, n, equal to or greater than 4, of voltage levels desired;

(c) calculating the number of switching device and anti-parallel diode pairs required for each said phase leg as 2(n−1);

(c) calculating the number of capacitors required as n−1;

(d) designing a standard switching device and clamping diode rectifier circuit for each said phase leg; and (e) removing switching devices from the top and bottom of each said phase leg of said rectifier circuit while leaving said anti-parallel diodes in said rectifier circuit, whereby a reduced switching parts-count multilevel rectifier is achieved.

* * * * *